United States Patent [19]

Sakoda et al.

[11] Patent Number: 5,215,799
[45] Date of Patent: Jun. 1, 1993

[54] OPTICAL DISK SUBSTRATE AND OPTICAL INFORMATION-STORAGE MEDIUM

[75] Inventors: Atsunobu Sakoda; Katsumi Uchiyama; Toshihiko Fujishima, all of Chiba, Japan

[73] Assignee: Idemitsu Petrochemical Co., Ltd., Tokyo, Japan

[21] Appl. No.: 663,468

[22] Filed: Mar. 4, 1991

Related U.S. Application Data

[63] Continuation-in-part of Ser. No. 468,862, Jan. 23, 1990, abandoned.

Foreign Application Priority Data

[30] Jan. 25, 1989 [JP] Japan .................................. 1-14079

[51] Int. Cl.$^5$ .............................................. B32B 3/00
[52] U.S. Cl. .......................................... 428/64; 428/65; 428/412; 428/913; 430/945; 346/76 L; 346/135.1; 369/288
[58] Field of Search .................... 428/64, 65, 412, 913; 369/288; 346/76 L, 135.1; 430/945

[56] References Cited

U.S. PATENT DOCUMENTS

| | | | |
|---|---|---|---|
| 3,981,707 | 9/1976 | Araujo et al. | 65/3 A |
| 4,199,540 | 4/1980 | Adelmann et al. | 528/204 |
| 4,509,163 | 4/1985 | Kamada et al. | 369/288 |
| 4,701,770 | 10/1987 | Ito et al. | 346/135.1 |
| 4,918,160 | 4/1990 | Kondoh et al. | 528/483 |

Primary Examiner—Patrick J. Ryan
Assistant Examiner—Elizabeth Evans
Attorney, Agent, or Firm—Antonelli, Terry, Stout & Kraus

[57] ABSTRACT

Disclosed is an optical disk substrate which comprises a polycarbonate resin containing not more than 1 ppm of each metal belonging to the IA group and the VIII group of the Periodic Table, and not more than 0.3 mol percent, per polymerization repeating unit, of a terminal hydroxyl group. Also disclosed is an optical information-storage medium comprising an optical recording layer formed on the optical disk substrate.

6 Claims, 1 Drawing Sheet

OPTICAL DISK SUBSTRATE AND OPTICAL INFORMATION-STORAGE MEDIUM

This is a continuation-in-part of Ser. No. 468,862, filed Jan. 23, 1990, now abandoned.

BACKGROUND OF THE INVENTION

1. Field of the Invention

The present invention relates to an optical disk substrate which maintains a high reliability for a long term, and an optical information-storage medium comprising the disk substrate.

2. Description of the Related Art

A polycarbonate resin has been widely used as a substrate for an optical information-storage medium such as an audio-disk, a laser disk, an optical disk memory and a magneto-optical disk, from which information may be read out, written to and/or rewritten, by utilizing laser beams, because the polycarbonate resin has an excellent moldability, strength, light-transmissibility, moisture resistance, and so on. Nevertheless, although the polycarbonate resin exhibits such excellent properties, it has disadvantages that it is easily hydrolyzed under an elevated temperature and a high humidity. This results in lowering of a molecular weight and strength, and also whitening of the product or generation of white points in the product.

The optical disk substrate and the optical information-storage medium prepared therefrom, must be able to maintain a high reliability for a long term (e.g., 10 years or more), but it is difficult to meet this requirement, because of a rapid deterioration of the polycarbonate resin by hydrolysis under an elevated temperature and high humidity.

Various attempts have been proposed to increase a corrosion resistance of an information-storage medium made of the polycarbonate resin. For example, Japanese Unexamined Patent Publication (KOKAI) No. 63-97627 discloses a reduction of a remaining chlorine content to 1 ppm or less. Japanese Unexamined Patent Publication (KOKAI) No. 63-257933 discloses a reduction of a remaining free chlorine content to 1 ppm or less and a phosphorus content to 5-10 ppm.

The techniques disclosed in the above Publications can prevent a corrosion deterioration of the information-recording layer to some extent, but these techniques are not relevant to the deterioration of the polycarbonate resin per se.

SUMMARY OF THE INVENTION

The present inventors have made intensive studies to overcome the above problems, and as a result, they found that the hydrolysis of the polycarbonate resin is caused by an interaction between trace amounts of metals (notably, specific metals as listed hereinafter) remaining therein and trace amounts of solvents (notably, chlorinated compound solvents) remaining therein, the presence of a terminal hydroxyl group, and/or an interaction of a terminal hydroxyl group and a small amount of remaining metal such as sodium, contained in the polycarbonate resin.

Accordingly, one of the objects of the present invention is to provide an optical disk substrate and an optical information-storage medium prepared therefrom, which are capable of maintaining a high reliability for a long time by efficiently inhibiting the deterioration of the polycarbonate resin.

Other objects and advantages of the present invention will be apparent from the following description.

In accordance with the present invention, there is provided an optical disk substrate which comprises a polycarbonate resin containing not more than 1 ppm of each metal belonging to the IA group and the VIII group of the Periodic Table, and not more than 0.3 mol percent of a terminal hydroxyl group, per polymerization repeating unit. In other words, metals belonging to the IA group and the VIII group of the Periodic Table, contained in the polycarbonate resin, do not exist in an amount of more than 1 ppm, respectively, and terminal hydroxyl groups do not exist in an amount of more than 0.3 mol percent per polymerization repeating unit. Preferably, the optical disk substrate of the present invention comprises a polycarbonate resin containing not more than 1 ppm of each metal belonging to the IA group and the VIII group of the Periodic Table; not more than 10 ppm of a remaining chlorinated compound solvent; and not more than 0.3 mol percent of a terminal hydroxyl group, per polymerization repeating unit.

In accordance with the present invention, there is also provided an optical information-storage medium comprising an optical information-recording layer formed on the above-mentioned optical disk substrate.

The metals belonging to the IA group of the Periodic Table include lithium (Li), sodium (Na), potassium (K), rubidium (Rb), cesium (Cs) and francium (Fr), particularly sodium (Na) and potassium (K). The metals belonging to the VIII group of the Periodic Table include iron (Fe), cobalt (Co), nickel (Ni), ruthenium (Ru), rhodium (Rh), palladium (Pd), osmium (Os), iridium (Ir) and platinum (Pt), particularly, iron (Fe), cobalt (Co), or nickel (Ni).

Further, the chlorinated compound solvent is typically a hydrocarbon halide or a carbon halide, such as chloromethane, dichloromethane, trichloromethane, or tetrachloromethane.

DESCRIPTION OF THE PREFERRED EMBODIMENTS

Figure 1:
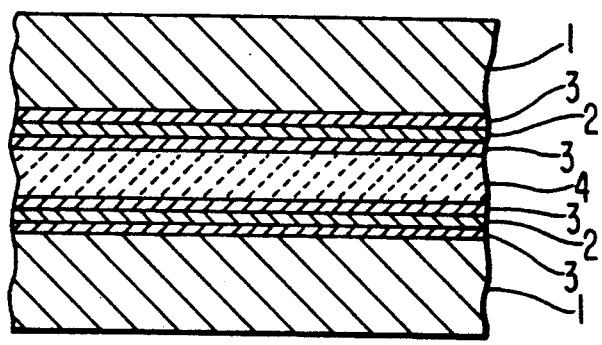
FIGS. 1 and 2 are sectional views schematically illustrating structures of embodiments of optical information-storage mediums according to the present invention.

The polycarbonate resins which may be used for the optical disk substrate of the present invention are not limited, but include, for example, a polycarbonate resin having a viscosity-average molecular weight of 10,000 to 22,000, preferably 12,000 to 20,000 and prepared by reacting a dihydric phenol and a carbonate, such as phosgene or diphenyl carbonate.

The dihydric phenols which can be used in the present invention include, for example, hydroquinone, 4,4'-dioxyphenyl, bis(hydroxyphenyl)alkane, bis(hydroxyphenyl)cycloalkane, bis(hydroxyphenyl)ether, bis(hydroxyphenyl)ketone, bis(hydroxyphenyl)sulfide, bis(hydroxyphenyl)sulfone, and the lower alkyl- or halogen-substituted derivatives thereof. Preferred are 2,2'-bis(4-hydroxyphenyl)propane (hereinafter referred to as Bisphenol A), 1,1-bis(4-hydroxyphenyl)ethane, 2,2-bis(4-hydroxyphenyl)-hexafluoropropane and the like.

The above dihydric phenols may be used alone, or in a combination thereof.

The polycarbonate resins according to the present invention may have a branched chain in part.

The viscosity-average molecular weight of 10,000 to 22,000 can be controlled by adding a capping agent, such as p-t-butylphenol, during manufacturing of the polycarbonate. If the viscosity-average molecular weight is less than 10,000, a strength of the optical disk substrate may become too low to withstand practical use. If the viscosity-average molecular weight is beyond 22,000, an optical disk substrate having a good moldability and optical properties may not be obtained. Thus, the polycarbonate resins within the above range are usually used.

The viscosity-average molecular weight [Mv] can be calculated by determining a specific viscosity [$\eta$sp] of a solution of polycarbonate in methylene chloride at 20° C., and using the following equations:

$$\eta sp/C = [\eta](1+0.28\,\eta sp)$$

wherein C means a concentration of polycarbonate resin (g/l), and $$[\eta] = 1.23 \times 10^{-5} Mv^{0.83}.$$

After a polycarbonate resin to be subjected to injection molding is prepared in accordance with a conventional known process, preferably the solution thereof is washed repeatedly with an alkaline and acid solution, and water, and filtered, or alternatively, the granulates thereof are washed with a poor solvent such as acetone, while heated, to remove impurities or foreign substances such as low-molecular weight components, unreacted components, metallic components and so on. The amounts of foreign substances, impurities, solvents and so on contained in the raw material for injection molding should be as low as possible. In addition, the amount of terminal hydroxyl groups should be as low as possible. In this case, polycondensation conditions should be carefully determined.

If necessary, the raw material may contain additives, such as an antioxidant, e.g., phosphorus derivatives.

Further, the polycarbonate resins as raw material for an optical disk substrate preferably have a foreign-substances index of not more than 30,000 $\mu m^2/g$, more preferably not more than 15,000 $\mu m^2/g$.

As used herein, the term "foreign-substances index" means a sum of a product of (i) a square of a particle diameter and (ii) the number, of each foreign substance (having a particle diameter of 0.5 micron or more) per unit weight. The foreign-substances are detected in a solution prepared by dissolving in an excess amount of an organic solvent (particularly, methylene chloride) a material (e.g., a raw material or a substrate) to be evaluated. The index is calculated from the equation:

$$I = \Sigma\{[\tfrac{1}{2}(di+di+1)]2 \times (ni-ni')\} \div W$$

wherein
I denotes the foreign-substances index;
$d_i$ denotes an i-th numerical value ($\mu$m) for dividing a range of the particle diameter;
$n_i$ denotes the number of foreign substances having a particle diameter of less than $d_{i+1}$ and not less than $d_i$, and detected in the solvent;
$n_i'$ denotes the number of foreign substances involved in the solvent before use; and W denotes the weight (g) of a material.

An example of the numerical values for dividing the range of the particle diameter is as follows:

| | |
|---|---|
| $d_1 = 0.5\ \mu m$ | $d_2 = 0.6\ \mu m$ |
| $d_3 = 0.7\ \mu m$ | $d_4 = 1.1\ \mu m$ |
| $d_5 = 2.5\ \mu m$ | $d_6 = 5.0\ \mu m$ |
| $d_7 = 10.0\ \mu m$ | $d_8 = 20.0\ \mu m$ |
| $d_9 = 25.0\ \mu m$ | |

If foreign substances having a diameter of more than 25.0 $\mu$m are detected, $d_{10}$, $d_{11}$ and so on having an appropriate numerical value are used.

During the injection molding, the temperature of the resin may be controlled at 300 to 400° C., and the temperature of the mold may be controlled usually at 50 to 140° C., more preferably at 80 to 130° C. Further, the material of the mold is appropriately chosen so that incorporation of the metal component from the mold into the resins is minimized during the injection molding.

In addition, it is possible that only a surface temperature of the mold is made higher than a glass transition temperature of the resin, using a high frequency or the like, and after injecting the resin, the resin may be cooled to a temperature at which the disk substrate can be taken out. This process results in a substrate having improved optical properties.

In the optical disk substrate produced as above, any metals belonging to the IA group and the VIII group and remaining in the substrate, should be present in an amount of not more than 1 ppm, individually and respectively. Further, it is necessary to reduce a terminal hydroxyl group content of the optical disk substrate to 0.3 mol percent or less, per the polymerization repeating unit. In this case, a total content of the metals belonging to the IA group and the VIII group and remaining in the substrate, is preferably not more than 1 ppm. The amount of the remaining chlorinated compound solvents (as a whole) is preferably not more than 10 ppm, more preferably not more than 6 ppm.

Experiments conducted by the present inventors showed that the presence of the remaining metals belonging to the IA group and the VIII group, particularly iron (Fe) or sodium (Na), in an amount of more than 1 ppm, and the presence of the terminal hydroxyl groups in an amount of more than 0.3 mol percent per the polymerization repeating unit, cause a rapid deterioration of the polycarbonate resin.

According to the experiments by the present inventors, it was found that, when a metal such as iron or sodium, remains in an amount beyond 1 ppm; the chlorinated compound solvents (such as chloromethane, dichloromethane, trichloromethane, tetrachloromethane or dichloromethane) remain in an amount beyond 10 ppm; and the hydroxyl groups remain in an amount beyond 0.3 mol percent, an interaction occurs between the metal and the solvents or the terminal hydroxyl groups. This results in whitening of the resultant substrate or drastic increase of white points generated in the substrate, and acceleration of deterioration of the polycarbonate resin.

In addition, according to the present invention, it is preferable to add 0.002 to 0.5 weight percent, preferably 0.005 to 0.1 weight percent of fatty acid monoglyceride having 14 to 30, preferably 16 to 24 carbon atoms, to a polycarbonate resin since the generation of white points is reduced for unknown reasons.

To ensure that no metals belonging to the IA group and the VIII group remain in the polycarbonate resin in an amount of more than 1 ppm, an incorporation of the metals into the resin should be prevented, during the manufacturing step thereof. For example, the metals should not be used for a manufacturing apparatus or piping.

To ensure that the amount of each remaining metal is less than 1 ppm, a solution (in dichloromethane) of the polycarbonate resin after polymerization should be thoroughly washed with an alkaline and acid solution, and water with a high purity.

Further, to ensure that the amount of the remaining chlorinated compound solvent is less than 10 ppm, the polycarbonate resin should be granulated, and then, thoroughly washed with a poor solvent (e.g., acetone) to remove the chlorinated compound solvents, such as dichloromethane, and further, thoroughly dried.

Apart from the metals belonging to the IA group and the VIII group, preferably no metals belonging to the IIIB group, the IVB group, and the IIA group, such as aluminum (Al), silicon (Si), calcium (Ca) or magnesium (Mg) remain in an amount of more than 1 ppm, respectively.

In the practice of the present invention, any methods can be used to make the polycarbonate resin to have a terminal hydroxyl group content of not more than 0.3 mol percent. It is preferable to combine effective methods such as optimization of polycondensation conditions for producing a polycarbonate resin; washing of a methylene chloride solution after polycondensation with alkali, acid and highly purified water; and washing of powder polymers with a poor solvent such as acetone.

Preferable methods include, for example, a process which comprises sufficiently washing a polycondensate solution, preparing powders of the polycondensate from the polycarbonate solution in warm water using a method, for example, described in KOKAI Hei 1-74,231, and then washing the obtained powders with a mixed solution comprising methylene chloride and acetone. According to this technique, powders of polycondensates having a particle size of about 1 mm can be obtained even if the polycondensates have low molecular weight. Thus, the obtained products are easy to handle and easy to melt-mold.

The optical information-storage medium according to the present invention will be described hereinafter with reference to embodiments illustrated in FIGS. 1 and 2.

Figure 2:
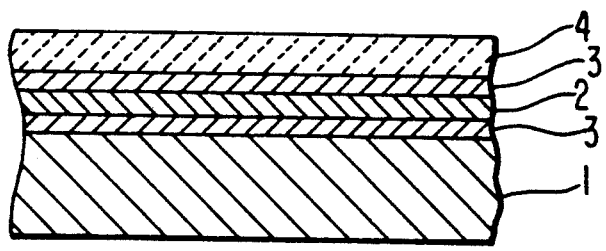

FIG. 1 shows an optical information-storage medium making a double-side recording structure, and FIG. 2 shows an optical information-storage medium making a one-side recording structure.

The optical information-storage medium according to the present invention has the same structure as that of a conventional information-storage medium, except that the information-storage medium includes the optical substrate according to the present invention.

In FIGS. 1 and 2, an optical disk substrate 1 is prepared from a polycarbonate resin, and an information-recording layer 2 is formed thereon by evaporating or spattering a combined material of a transition metal (e.g., iron or cobalt) and a rare earth element [e.g., terbium (Tb), gadolinium (Gd), neodymium (Nd) or dysprosium (Dy)]. Both sides of the recording layer 2 are protected by two protective layers 3, respectively. The protective layer 3 is prepared from silicone ceramics or the like. An overcoat layer 4 (FIG. 2) or an adhesive layer 4 (FIG. 1) is made from an ultraviolet-curable resin, thermoset resin, hot-melt adhesive or the like.

The optical information-storage medium carrying the information-recording layer formed on the optical disk substrate, as above, can be used as a write-once or rewritable medium.

The present invention will be further described with reference to non-limitative Examples.

EXAMPLES AND COMPARATIVE EXAMPLES

In Examples A1 to A3 and Comparative Examples A1 to A3, optical disk substrates as described in Table 1 were prepared by injection molding. In these Examples or Comparative Examples, the remaining metal content and the terminal hydroxyl group content were controlled by changing the following conditions (a) to (d) from time to time.

(a) Polycondensation Conditions
(b) Conditions of Washing with Alkali, Acid and Water
(c) Granulation Conditions
(d) Conditions for Extraction of Powder Products In addition, the viscosity-average molecular weight, the remaining metal content, the remaining solvent content and the terminal hydroxyl group content, were measured in accordance with the following methods. The injection molding was conducted under the following conditions.

VISCOSITY-AVERAGE MOLECULAR WEIGHT

Measurement Method: Schnell Viscosity Equation $$[\eta] = 1.23 \times 10^{-5} M v^{0.83}$$

wherein is a intrinsic viscosity.

REMAINING METAL CONTENT (Na and Fe)

Atomic-absorption Spectroscopy

REMAINING SOLVENT CONTENT ($CH_2Cl_2$)

Gas Chromatography

TERMINAL HYDROXYL GROUP CONTENT

Measurement Method: $^1$H-NMR

Terminal OH Content (mol %) =

$$\frac{\text{Number of Terminal OH Content (mol \%)}}{\text{Number of Repeating Units of Polymer Chain } (n)} \times 100\%$$

As used herein, n means the number of the repeating unit;

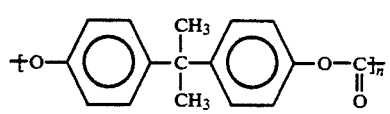

INJECTION MOLDING

A polycarbonate resin as starting material was injection-molded at a molding temperature of 360° C. and at a mold temperature of 120° C. to obtain an optical disk substrate having a substrate size of 130 mmo and a thickness of 1.2 mm.

And then, the accelerating deterioration test and bit error ratio test as described below were conducted using the optical disk substrates obtained in the Examples and the Comparative Examples.

ACCELERATING DETERIORATION TEST

The accelerating deterioration test was conducted by placing substrate samples in a thermohygrostat, inner atmosphere of which was kept at 80° C. and 90% RH. 1000 hours after the placement, and 2000 hours after the placement, the samples were taken out, and appearance of the samples were checked. Also, the molecular weight of the samples was measured.

Further, using ten optical disk substrates of each sample, generation of white points was checked by counting number of white points having a size of not smaller than 50 μm appearing in the samples by visual observation. The average numbers of the white points counted are as shown in Table 1.

TABLE 1

|  | PC substrate (Initial) | | | | At 80° C. & 90% RH for | | | | | |
|---|---|---|---|---|---|---|---|---|---|---|
|  |  | Na | Fe | CH$_2$Cl$_2$ | OH group | 1000 Hr. | | | 2000 Hr. | | |
|  | Mv | (ppm) | (ppm) | (ppm) | (mol %) | Mv | AP | NW | Mv | AP | NW |
| Example A1 | 14,200 | 0.3 | 0.2 | 3 | 0.13 | 14,000 | G | 0 | 13,900 | G | 0 |
| Example A2 | 14,300 | 0.2 | 0.1 | 2 | 0.23 | 14,200 | G | 0 | 14,000 | G | 0 |
| Example A3 | 14,400 | 0.2 | 0.1 | 10 | 0.20 | 13,900 | G | 0.1 | 13,800 | W | 0.4 |
| Comp. Ex. A1 | 14,400 | 1.4 | 0.4 | 10 | 0.34 | 13,400 | W | 4.8 | 13,200 | W | 25.1 |
| Comp. Ex. A2 | 14,300 | 1.5 | 1.5 | 15 | 0.19 | 13,100 | W | 4.4 | 12,900 | W | 20.3 |
| Comp. Ex. A3 | 14,400 | 0.2 | 0.1 | 2 | 0.35 | 13,300 | W | 2.9 | 13,000 | W | 9.8 |

In Table 1,
"PC" means polycarbonate;
"Mv" means viscosity-average molecular weight;
"OH group" means terminal hydroxyl group content;
"NW" means number of white points generated per substrate;
"Comp. Ex." means a Comparative Example;
"AP" means appearance;
"G" means "good"; and
"W" means "slightly whitened".

EXAMPLES B1 AND B2, AND COMPARATIVE EXAMPLES B1 AND B2

Optical information-storage media were prepared using the optical disk substrates obtained in Examples A1 and A2, and Comparative Examples A1 and A2 (Examples B1 and B2, and Comparative Examples B1 and B2).

The optical information-storage medium had a one-side recording structure as shown in FIG. 2. The following layers were coated on a substrate.
Recording Layer: Tb-Fe-Co Type (800A)
Protection Layer: SiN (800A)
Over Coating Layer: Ultra Violet Ray Curable Resin (10 μm)

Figure 3:
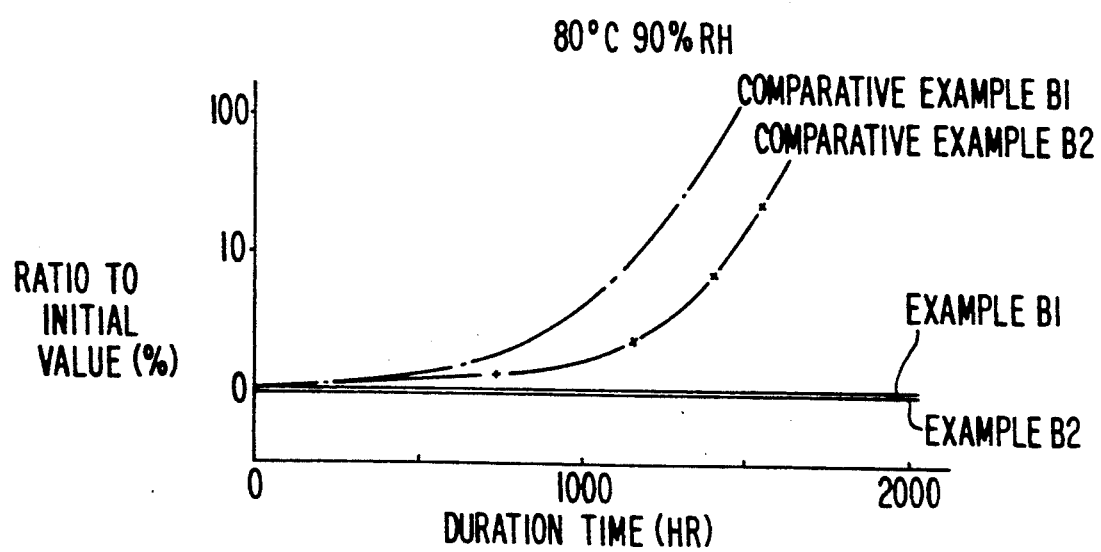
FIG. 3 is a graph showing a change in a bit error ratio of an optical information-storage medium of the present invention or of Comparative Examples.

As for the information-storage media according to the present invention (Examples B1 and B2) and the information-storage media for comparison (Comparative Examples B1 and B2), changes in the bit error ratio were measured by Evaluation Device OMS-1000 (manufactured by NAKAMICHI). The results are as shown in FIG. 3.

Although the present invention has been described with reference to specific embodiments, various changes and modifications obvious to those skilled in the art are deemed to be within the spirit, scope and concept of the present invention.

What is claimed is:

1. An optical disk substrate which comprises a polycarbonate resin containing not more than 1 ppm of each metal belonging to the IA group and the VIII group of the Periodic Table, not more than 0.3 mol percent, per polymerization repeating unit, of a terminal hydroxyl group and not more than 10 ppm of a remaining chlorinated compound solvent, said polycarbonate resin having a viscosity average molecular weight of 10,000 to 22,000.

2. An optical disk substrate according to claim 1, wherein the metal belonging to the group IA is sodium or potassium.

3. An optical disk substrate according to claim 1, wherein the metal belonging to the group VIII is iron, nickel or cobalt.

4. An optical information-storage medium comprising an optical recording layer formed on an optical disk substrate prepared from a polycarbonate resin containing not more than 1 ppm of each metal belonging to the IA group and the VIII group of the Periodic Table, not more than 0.3 mol percent, per polymerization repeating unit, of a terminal hydroxyl group and not more than 10 ppm of a remaining compound solvent, said polycarbonate resin having a viscosity-average molecular weight of 10,000 to 22,000.

5. An optical information-storage medium according to claim 4, wherein the metal belonging to the group IA is sodium or potassium.

6. An optical information-storage medium according to claim 4, wherein the metal belonging to the group VIII is iron, nickel or cobalt.

* * * * *